(12) United States Patent
Tsirulnik et al.

(10) Patent No.: US 10,366,130 B2
(45) Date of Patent: Jul. 30, 2019

(54) GENERATION OF COMPLEMENTARY APPLICATIONS

(71) Applicant: SAP Portals Israel Ltd., Ra'Anana (IL)

(72) Inventors: Boris Tsirulnik, Rishon Lezion (IL); Inbal Zilberman, Ahela (IL); Amiram Wingarten, Rehovot (IL)

(73) Assignee: SAP Portals Israel Ltd., Ra'Anana (IL)

( * ) Notice: Subject to any disclaimer, the term of this patent is extended or adjusted under 35 U.S.C. 154(b) by 459 days.

(21) Appl. No.: 14/980,555

(22) Filed: Dec. 28, 2015

(65) Prior Publication Data

US 2017/0185684 A1 Jun. 29, 2017

(51) Int. Cl.
*G06F 16/9535* (2019.01)
*G06F 16/248* (2019.01)
*G06F 16/954* (2019.01)

(52) U.S. Cl.
CPC ........ *G06F 16/9535* (2019.01); *G06F 16/248* (2019.01); *G06F 16/954* (2019.01)

(58) Field of Classification Search
CPC ................. G06F 17/30294; G06F 16/9535
See application file for complete search history.

(56) References Cited

U.S. PATENT DOCUMENTS

| | | | | |
|---|---|---|---|---|
| 7,797,304 | B2 * | 9/2010 | Muralidhar | G06F 17/30914 707/713 |
| 2008/0228697 | A1 * | 9/2008 | Adya | G06F 17/30595 |
| 2010/0082646 | A1 * | 4/2010 | Meek | G06F 17/3056 707/752 |
| 2013/0066828 | A1 * | 3/2013 | Vasters | H04N 21/2665 707/609 |
| 2013/0144878 | A1 * | 6/2013 | James | G06F 17/30997 707/736 |
| 2013/0159938 | A1 * | 6/2013 | James | G06F 3/017 715/863 |
| 2014/0156634 | A1 * | 6/2014 | Buchmann | G06F 17/30572 707/714 |
| 2015/0120701 | A1 * | 4/2015 | Schmidt | G06F 17/3089 707/722 |

(Continued)

*Primary Examiner* — Mohammad S Rostami
(74) *Attorney, Agent, or Firm* — Schwegman Lundberg & Woessner, P.A.

(57) ABSTRACT

An application complementation module may access application data from an application repository, the application data associated with a first application. The data collections of a data service provider (e.g., OData service) used in the first application and at least one navigation used in the first application to navigate between the data collections are determined based on the application data. Service metadata (e.g., Entity Data Model (EDM)) from the data service provider is searched for new navigations between the used data collections that are different from the navigations used in the first application. An application that is complementary (e.g., provides different or complementary navigations) to the first application may then be generated based on the data collections used in the first application and any new navigations between the data collections discovered from the service metadata. A recommendation regarding the generated application may be provided to a user of the first application.

17 Claims, 9 Drawing Sheets

(56) References Cited

U.S. PATENT DOCUMENTS

| | | | |
|---|---|---|---|
| 2015/0142781 A1* | 5/2015 | Nigam | G06F 17/30557 707/722 |
| 2016/0019295 A1* | 1/2016 | Makris | G06F 17/30864 707/770 |
| 2016/0072927 A1* | 3/2016 | Xue | H04L 69/08 709/203 |
| 2016/0140184 A1* | 5/2016 | Deissner | G06F 17/30507 707/780 |

* cited by examiner

GENERATION OF COMPLEMENTARY APPLICATIONS

TECHNICAL FIELD

The present disclosure relates generally to the discovery, recommendation and generation of a complementary application to an application generated and/or accessed by a user. In an example embodiment, after determining which data collections and which navigations between the collections are used by the application generated and/or accessed by a user, a complementary application that uses the same data collections but with navigations between them in the reverse directions may be suggested to the user and generated if desired by the user.

BACKGROUND

In an application development environment, an application, for example a client or a cloud-based hosted application, may combine and use source data, presentation, and/or functionality (resources) from two or more data sources to create new functionality based on using existing data resources. This type of "combination" application may be generated in a generic manner via a simple combination, visualization, and aggregation of data accessed via a data service provider. This type of application allows for easy and fast integration of data and may use open application programming interface (API)s and/or data sources to produce the new functionality even if the functionality is not related in any way to the original reason for compiling the source data.

Currently many such combination applications are developed based on the Open Data Protocol (OData), which is an open protocol which allows the creation and consumption of queryable and interoperable representational state transfer (REST) APIs in a standard manner. REST is a software architectural style used, for example, in the World Wide Web. REST provides design component parameters for components of a distributed media system. At a high level of abstraction the OData services may be viewed as comprising data collections and navigations between these collections. Therefore combination application types which allow users to navigate from one collection to another based on navigations in the OData service are easily generated.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
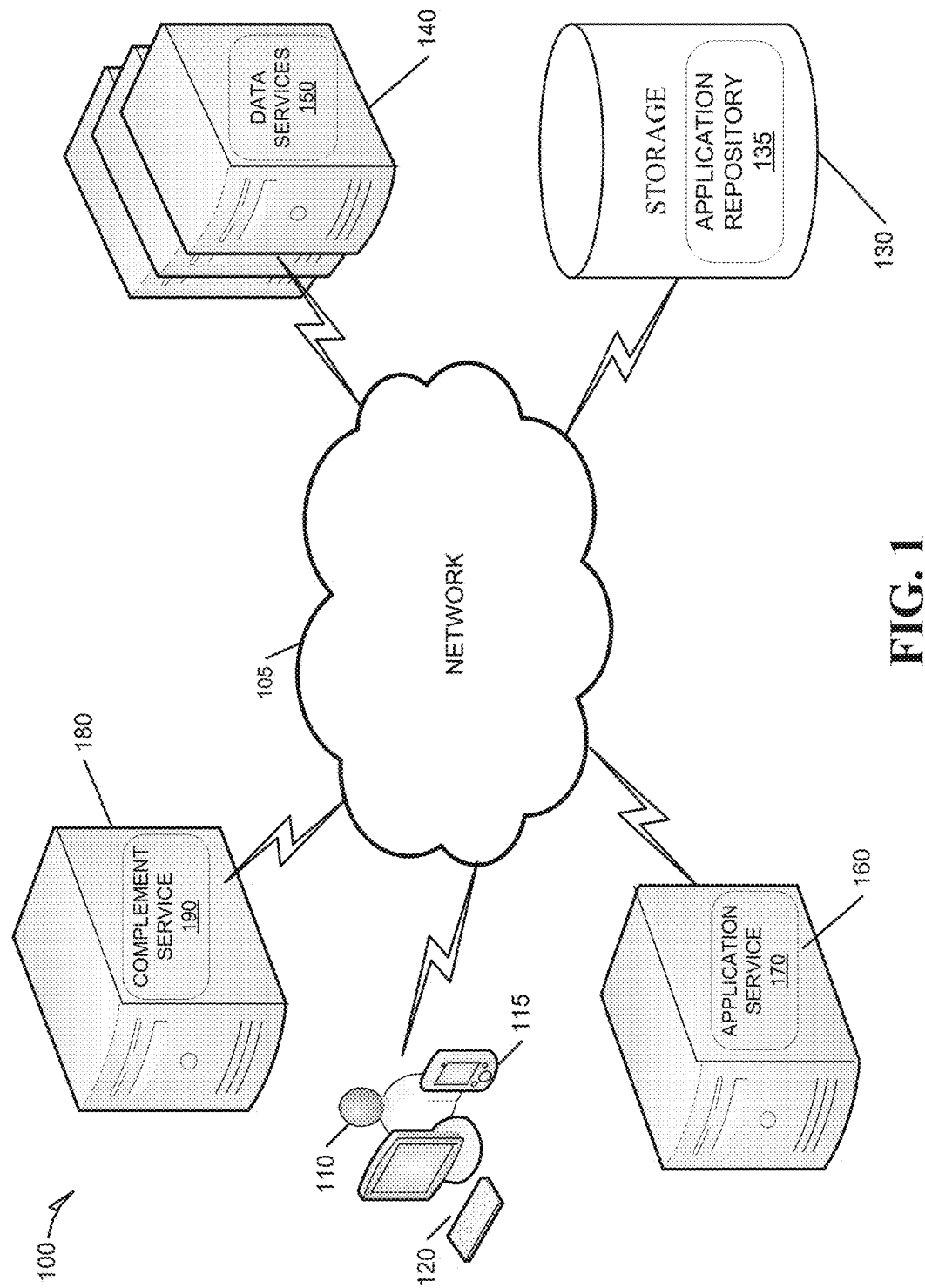
FIG. 1 is a use-case diagram showing a system, consistent with some embodiments, configured to generate a complementary application for a user-accessed application.

Application developers may use development tools to generate applications based on OData services, data collections in these services and navigations in these data collections. A developer may generate (or simply access) a first application that allows users to navigate from one data collection of an OData service to another collection based on navigations available in the OData service. According to example embodiments described herein, a complementary application to the first application with opposite navigation between the data collections could be generated and recommended to a developer or user of the first application. For example, an application developer may create an application for browsing products and suppliers (e.g., data collections for the products and suppliers) associated with a business enterprise. The generated application may allow browsing of the suppliers and then navigating to products associated with each of the suppliers for browsing of said products. In this situation, a "complementary" application is an application which will browse products and then navigate to suppliers associated with each of the products for browsing of said suppliers.

Embodiments described herein provide for automated generation of such a complementary application and a suggestion to a developer or user of the original application to incorporate the complementary application, e.g., via app-app navigation between the original and complementary applications. For example, when a developer is generating an original application or working on an existing application, an analysis of metadata from the OData service which is used in the application can be performed to discover the Entity Data Model (EDM) for the OData service. The EDM is the underlying abstract data model used by the OData service to formalize the description of the resources it exposes (e.g., products or suppliers) and the navigation links between the data collections (e.g., for products or suppliers) of the OData service. The OData service metadata may be accessed from an OData metadata document that describes the EDM for the OData service. If the application is using service collections A and B of the OData service and there is a navigation from collection A to collection B used in the application, then a search may be performed (e.g., in the OData service or in an application repository including similar applications) for an opposite navigation (e.g., from collection B to collection A). In case the opposite navigation exists, it may be used to generate a complementary application and the developer or user will receive a recommendation to access the complementary application or, as noted above, to incorporate the complementary application into the original application. The complementary application may be generated automatically based on the application fields which were used in the original application.

Embodiments described herein provide for an application complementation module that can access application data from an application repository, the application data associated with a first application. The data collections of a data service provider (e.g., OData service provider) used in the first application and at least one navigation used in the first application to navigate between the data collections may be determined based on the application data associated with the first application. Service metadata (e.g., EDM) from the data service provider is searched for new navigations between the used data collections that are different from the at least one navigation used in the first application. An application that is complementary (e.g., provides different navigations between the data collections) to the first application may then be generated based on the data collections used in the first application and any new navigations between the data collections that are discovered from the service metadata from the data service provider. A recommendation regarding the generated application may be provided to a developer or user of the first application. The complementary application may be generated automatically before or after such a recommendation is displayed.

Other embodiments provide for generating a different kind of complementary application based on a data collection of the data service provider that is not used in the first application but that is otherwise relevant to the first application based on the application data associated with the first application. For example, the first application may include a product list view. If the service metadata from the data service provider indicates a data collection for "customers" and a navigation between this customer data collection and a product data collection used to populate the product list in the first application, then a complementary application may be based on the customer and product data collections and the navigation between them.

In an embodiment, service metadata retrieved from the data service provider may describe at least one navigation for navigating between at least one data collection used in the first application and at least one data collection of the data service provider not used in the first application. A complementary application may then be generated based on the at least one data collection used in the first application, the at least one data collection not used in the first application, and the at least one navigation for navigating between the at least one data collection used in the first application and the at least one data collection not used in the first application.

In an embodiment, the service metadata is accessed from an OData service provider and the service metadata comprises an EDM. The EDM may define: a respective data type associated with each of the data collections of the OData service provider: at least one association between the data types associated with each of the data collections; and at least one navigation between the data types based on the at least one association between the data types.

In an embodiment, the first application is defined by a user and generating the complementary application includes retrieving other applications defined by the user from the application repository. Information regarding the data collections used in the retrieved applications and the navigations used in the retrieved applications to navigate between the respective data collections used in the retrieved applications may be determined from application data associated with the retrieve application. A complementary application may then be generated based on the data collections used in the retrieved applications and the navigations used in the retrieved applications to navigate between the respective data collections used in the retrieved applications. For example, if there are two applications, one with a product list screen and one with a manufacturer list, the complementary application may use data collections of the data service provider associated with both the product list and the manufacturer list and at least one navigation between them in the OData service discovered via the service metadata of the data service provider.

In an embodiment, the complementary application may be generated automatically because many user decisions that might normally be involved in the application generation process may be inferred from the user choices made in the first application. For example, the user experience (UX) qualities of the complementary application, such as fonts and themes, may be based on the UX qualities of the first application.

FIG. 1 is a use-case diagram showing a system 100, consistent with some embodiments, configured to generate a complementary application for a user-accessed application.

System 100 includes a network 105 that can be any medium used to provide communications links between various devices (e.g., storage) and computers connected together within the system 100. Network 105 may include connections, such as wired, wireless communication links, fiber optic cables, or the like. In the depicted example, network 105 may include the Internet. Of course, network 105 may also be implemented as a number of different types of networks, such as for example, an intranet, a local area network (LAN), or a wide area network (WAN). Multiple servers 140 are connected to network 105 along with one or more storages, such as storage 130 with application repository 135. In addition, client devices 115 and 120 of user 110 are also connected to network 105. Client device 120 may be, for example, a personal computer (PC) or a network computer. Client device 115 may be, for example, a mobile computer, a smart phone, a personal digital assistant (PDA) or other such mobile device. System 100 also includes an application service 170 (e.g., hosted on a server 160) for generating applications and a complement service 190 (e.g., hosted on a server 180) for recommending/generating complementary applications for applications generated or otherwise accessed by user 110.

System 100 may be used for implementing a client-server environment in which described embodiments may be implemented. A client-server environment enables software applications and data to be distributed across a network such that an application functions by using the interactivity between a client data processing system and a server data processing system. In this regard, an application being developed on client device 120 could make use of a server-side component (e.g., application service 170 or a data service 150) in servers 160, 180 or one or more of servers 140 (e.g., data service providers). Various data services 150 may communicate and/or exchange data and service metadata with clients (e.g., client device 120) or services (e.g., application service 170) via the servers 140 that connect to such clients or other servers (e.g., 160 and 180) hosting such services.

The user 110 can use client device 120 to generate and/or otherwise access a first application (e.g., access from application repository 135) using application service 170 and at least one of the data services 150. Application service 170 then returns the generated first application to client device 120 of user 110 and transmits the generated first application to application repository 135 where it is stored as application data associated with the first application. Complement service 190 may then access, from application repository 135, application data associated with the first application. Data collections (e.g., associated with entities used in the first application) of a data service 150 (e.g., OData service) used in the first application and at least one navigation used in the first application to navigate between the used data collections may be determined based on the application data associated with the first application. Service metadata (e.g., EDM from metadata document) is then retrieved from the data service 150 by complement service 190 and searched for new navigations between the used data collections, wherein the new navigations are different from the at least one navigation already used in the first application. An application that is complementary (e.g., provides different navigations between the data collections) to the first application may then be generated based on the data collections used in the first application and any new navigations between the data collections that are discovered from the service metadata retrieved by complement service 190 from the data service 150. A recommendation regarding the generated application may be provided (e.g., via a display of client device 120) to a developer or user of the first application. It is noted that the complementary application may be generated automatically before or after any such display of a recommendation for the complementary application.

A different kind of complementary application may be generated based on a data collection of the data service 150 that is not used in the first application but that is otherwise relevant to the first application based on the application data associated with the first application retrieved from the application repository 135. For example, the first application may include a product list view. If the service metadata from the data service 150 indicates a data collection for "customers" and a navigation between this customer data collection and a "product" data collection used to populate the above-mentioned product list in the first application, then a complementary application may be generated based on the customer and product data collections of the data service 150 provider and the navigation between them.

In an embodiment, the service metadata is accessed from a data service 150 that is an OData service and the service metadata comprises an EDM (as explained below with respect to FIGS. 2-3). The EDM may define: a respective data type associated with each of the data collections of the data service 150; at least one association between the data types associated with each of the data collections of the data service 150; and at least one navigation between the data types based on the at least one association between the types.

In an embodiment, the first application is defined by user 110 and generating the complementary application includes retrieving application data associated with other applications defined by the user 110 from the application repository 135. Information regarding the data collections used in the applications for which application data was retrieved and the navigations used in the said applications to navigate between the respective data collections used in the said applications may be determined from the application data associated with said applications that is retrieved from the application repository 135 via complement service 190. A complementary application may then be generated by complement service 190 (or application service 170) based on the data collections used in the said applications and the navigations used in the said applications to navigate between the respective data collections used in the said applications. For example, if there are two applications, one with a product list screen and one with a manufacturer list screen, the generated complementary application may use respective data collections of the data services 150 provider that are associated with both the product list and the manufacturer list and at least one navigation between them in the data services 150 discovered via the service metadata retrieved from the data services 150 via complement service 190.

Figure 2:
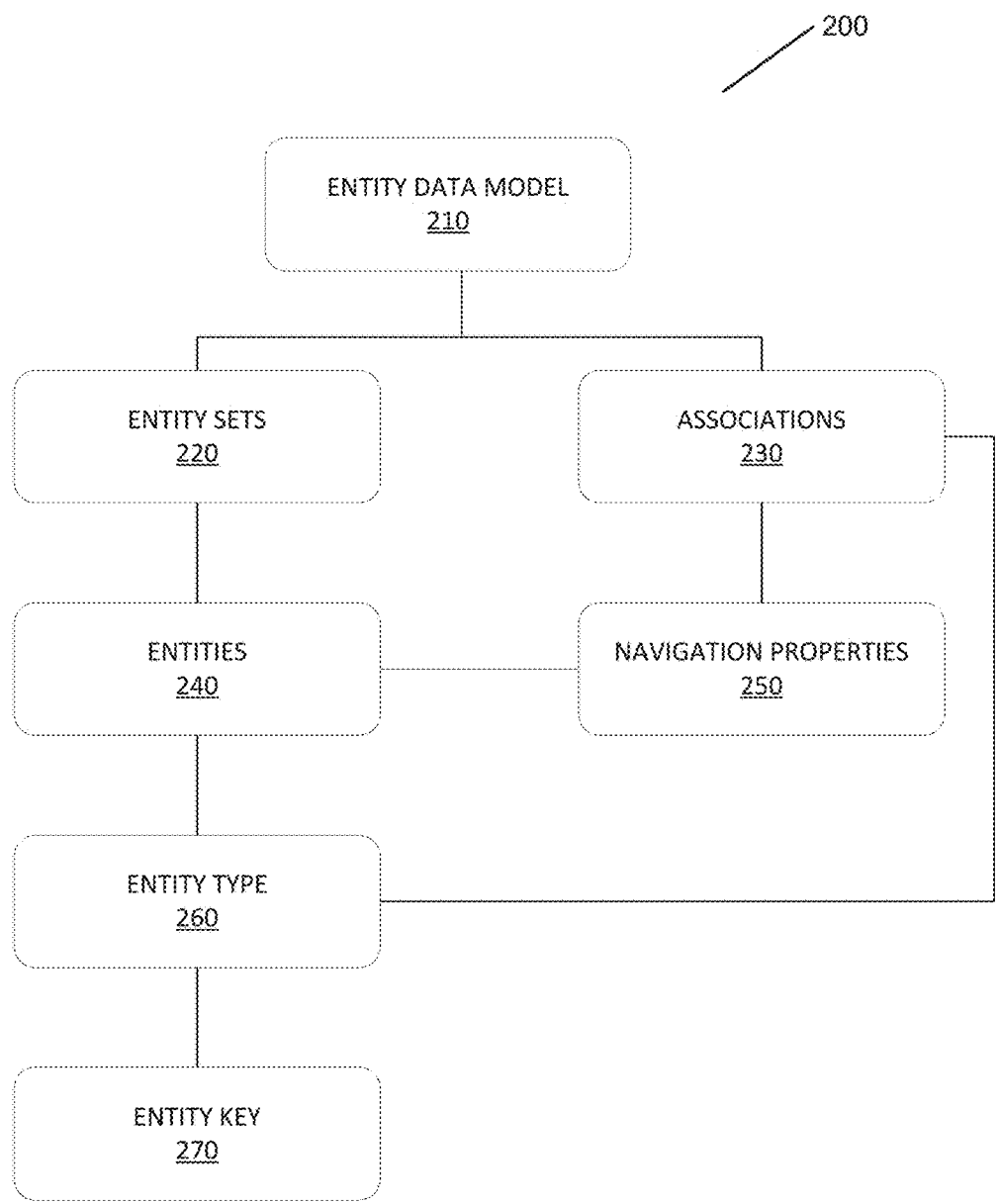
FIG. 2 is a block diagram of example service metadata of a data service provider, consistent with some embodiments, comprising an Entity Data Model (EDM) for defining parameters for interacting with the data service provider.

FIG. 2 is a block diagram of example service metadata 200 of a data service 150, consistent with some embodiments, comprising an EDM 210 defining parameters for interacting with the data service 150. The elements in FIG. 2 include elements from system 100 in FIG. 1 and are labeled with the same identifiers.

A user 110 of client device 120 may generate a first application using an application service 170 and a data service 150. The data service 150 may comprise an OData service that defines a protocol (that works with existing hypertext transfer protocols (HTTP) and REST protocols) and supports create, read, update, and delete (CRUD) operations for generating and consuming data APIs. The service metadata 200 of a data service 150 comprising an OData service can be visualized as shown in FIG. 2. The EDM 210 models data as entity sets 220 and associations 230 among those entity sets 220. Using this generic method allows the EDM 210 (and the data service 150) to work with nearly any kind of data. The EDM 210 will contain the definition of entity sets 220 which each contain multiple entities 240 of an entity type 260 (e.g., data type). Therefore, an entity set 220 is a data collection of entities 240 of a data type defined by the entity type 260. An entity type 260 can be, for example, a data type that contains fields for a specific types of business data such as customer, supplier, products etc. The entity type 260 can also specify how the data of each of the fields is stored, e.g., string, Boolean, binary etc. Furthermore, an entity key 270 may be used to uniquely identify an entity 240 of an entity type 260 including, for example, a customer number or product identifier, etc. The associations 230 define relationships between two or more entity types 260, e.g., an association between a product and a supplier of the product. Therefore, an entity set 220 including "product" type entities 240 can be associated with an entity set 220 including "supplier" type entities 240 in the service metadata 200. Special properties called navigation properties 250 represent associations 230 by implementing connections between entities 240 of separate entity sets 220. In the example of FIG. 2, each entity set 220 may represent a table in a relational database of the data service 150, with each entity 240 being a row in that table. Accordingly, the navigation properties 250 would represent relationships between rows, such as those shown in FIG. 3 which is described below.

Figure 3:
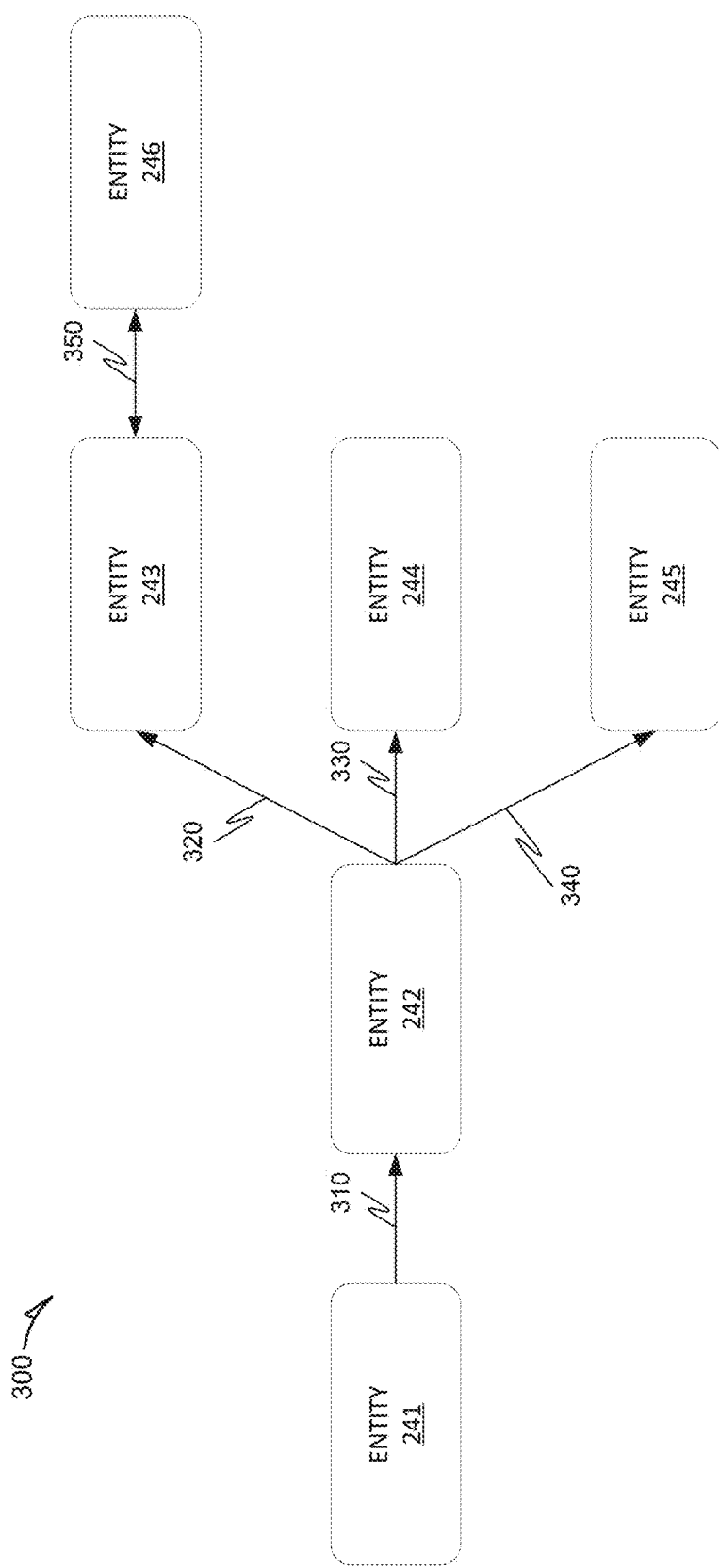
FIG. 3 is a block diagram showing how an EDM, consistent with some embodiments, models data as entities and navigations between the entities.

FIG. 3 is a block diagram 300 of how an EDM (e.g., EDM 210 of FIG. 2), consistent with some embodiments, models data as entities 241-246 and navigations 310-350 between the entities 241-246. The elements in FIG. 3 include elements from FIG. 1 and FIG. 2, which elements are labeled with the same identifiers.

The entities 241-246 depicted in FIG. 3 may each belong to different entity sets 220 so that each of the navigations 310-350 between the entities 241-246 is also a navigation between entity sets 220, as explained above. As shown in block diagram 30X), navigations 310-350 between the entities 241-246 can be one-to-one or many-to-one. For example, navigations 310 and 350 are one-to-one navigations (between entities 241 and 242, and 243 and 246, respectively) such as between a product identifier and a sales order identifier. On the other hand, navigations 320, 330 and 340 represent one-to-many navigations (between entity 242 and each of entities 243, 244 and 245) such as between a product identifier and manufacturer, supplier and customer identifiers. Furthermore, the navigations 310-350 between the entities 241-246 can also be unidirectional, as are 310-340 shown in block diagram 300, or bi-directional, like navigation 350 between entities 243 and 246. This type of bidirectional navigation between entities 240 of the EDM 210 may be used to generate a complementary application for a first application that uses data collections comprising entity sets 220 that respectively contain entities 243 and 246 and only navigate between the entity sets 220 that respectively contain entities 243 and 246 in one direction. The complementary application would be generated based on the entity sets 220 that respectively contain entities 243 and 246, and on the navigation between these sets 220 in the opposite (unused in first application) direction.

Figure 4:
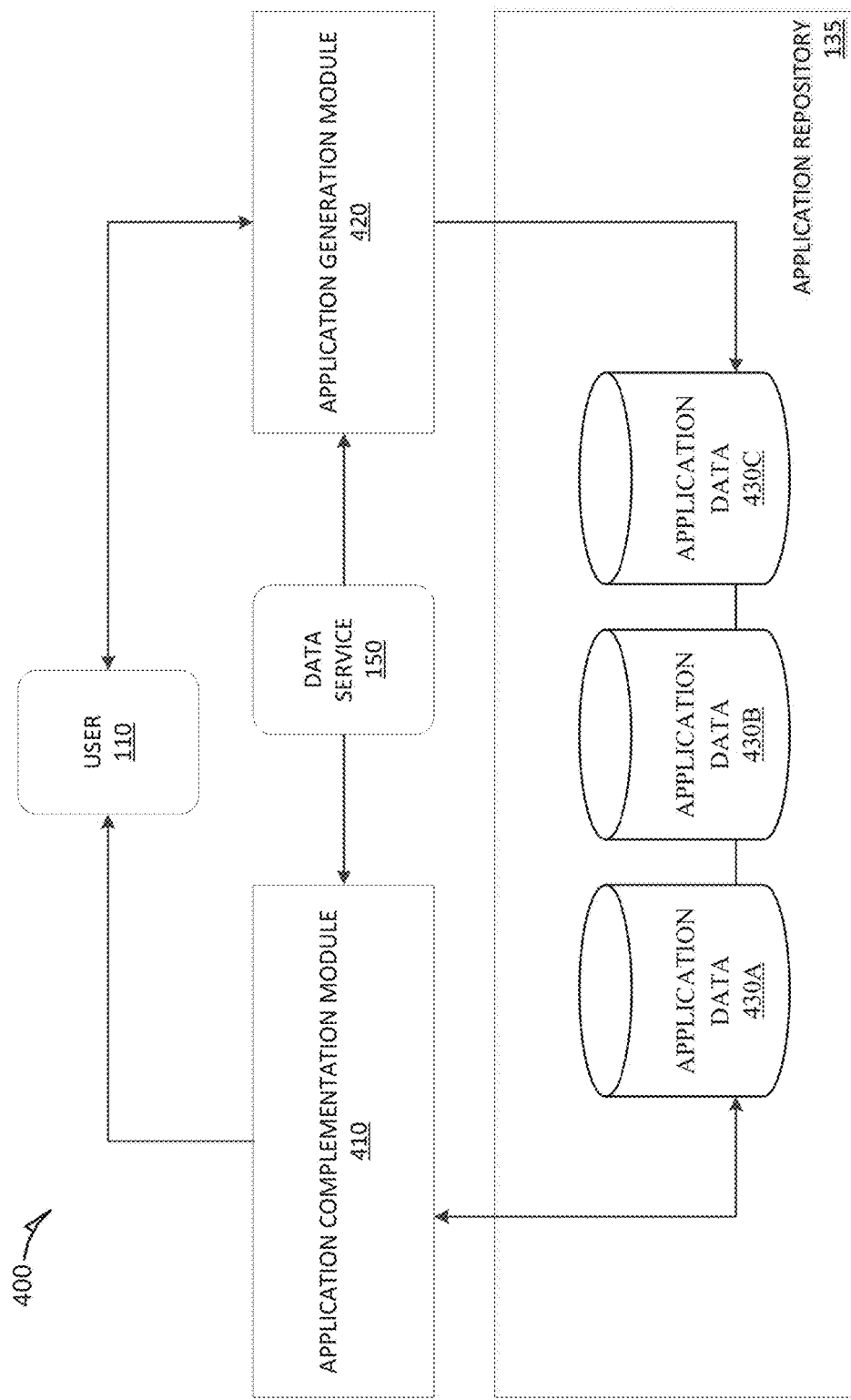
FIG. 4 is a block diagram of a data flow of a system, consistent with some embodiments, configured to generate a complementary application for a user-accessed application.

FIG. 4 is a block diagram of a data flow of a system 400, consistent with some embodiments, configured to generate a complementary application for a user-accessed application. The elements in FIG. 4 include elements from FIG. 1 and FIG. 2, which elements are labeled with the same identifiers.

The user 110 can (e.g., using client device 120) request a first application from an application generation module 420 (or simply access an application from the application repository 135) which generates the requested first application using a data service 150 (e.g., an OData service). The application generation module 420 then returns the generated first application to the user 110 and transmits the generated first application to application repository 135, where it is stored as application data 430A. An application complementation module 410 may then request application data 430A associated with the first application from application repository 135, which also includes application data associated with other application (e.g., application data 430B and 430C). The request from the application complementation module 410 may be triggered by new application data being stored in the application repository 135 or some other suitable trigger. Data collections (e.g., entity sets 220 associated with entities 240) used in the first application) of the data service 150 used in the first application and at least one navigation used in the first application to navigate between the used data collections may be determined by the application complementation module 410 based on the application data 430A associated with the first application.

Service metadata (e.g., EDM from metadata document) is then retrieved from the data service 150 by the application complementation module 410 and searched for new navigations between the data collections of the data service 150 used in the first application, the new navigations being different (e.g., opposite routing) from the at least one navigation already used in the first application. An application that is complementary (e.g., provides different navigations between the data collections) to the first application may then be generated by the application complementation module 410 or this may be delegated to the application generation module 420. The complementary application will use the data collections used in the first application and any new navigations between the used data collections that are discovered from the service metadata retrieved by application complementation module 410 from the data service 150. A recommendation regarding the generated application may be provided (e.g., via a display of client device 120) to a developer or user of the first application. It is noted that the complementary application may be generated automatically before or after any such display of a recommendation for the complementary application.

A different kind of complementary application may be generated based on a data collection of the data service 150 that is not used in the first application but that is otherwise relevant to the first application (e.g., an entity 240 belonging to the entity set 220 associated with the unused data collection is listed in a field of the application) based on the application data associated with the first application that is retrieved from the application repository 135. For example, the first application may include a product list view and may reference a customer entity in a listed field of the first application. If the service metadata from the data service 150 indicates a data collection for "customers" that is not used by the first application and a navigation between this customer data collection and a "product" data collection used to populate the above-mentioned product list in the first application, then a complementary application may be generated by the application complementation module 410 or the application generation module 420. The complementary application will use the customer and product data collections of the data service 150 provider and the discovered navigation between them.

Since the first application may be defined by user 110, generating the complementary application may include retrieving application data (e.g., 430B or 430C) associated with other applications defined by the user 110 from the application repository 135 by the application complementation module 410. Information regarding the data collections used in the previous user-defined applications for which application data was retrieved and the navigations used in the said applications to navigate between the respective data collections used in the previous user-defined applications may be determined from the application data associated with previous user-defined applications that is retrieved from the application repository 135 via the application complementation module 410. A complementary application may then be generated based on the data collections used in the previous user-defined applications and the navigations used in the previous user-defined applications to navigate between the respective data collections used in the previous user-defined applications. For example, if there are two previous user-defined applications, one with an employee list screen and one with a salaries list screen, the generated complementary application may use respective data collections of the data service 150 provider that are associated with both the employee list and the salaries list and at least one navigation between them in the data service 150 discovered via the service metadata retrieved from data service 150 by the application complementation module 410.

In an embodiment, the complementary application may be generated automatically by the application complementation module 410 (or the application generation module 420) because many user decisions that might normally be involved in the application generation process may be inferred from the user choices made in the first application or in any other previous user-defined applications. For example, the user experience (UX) qualities of the complementary application, such as fonts and themes, may be based on the UX qualities of the first application or other previous user-defined applications.

Figure 5:
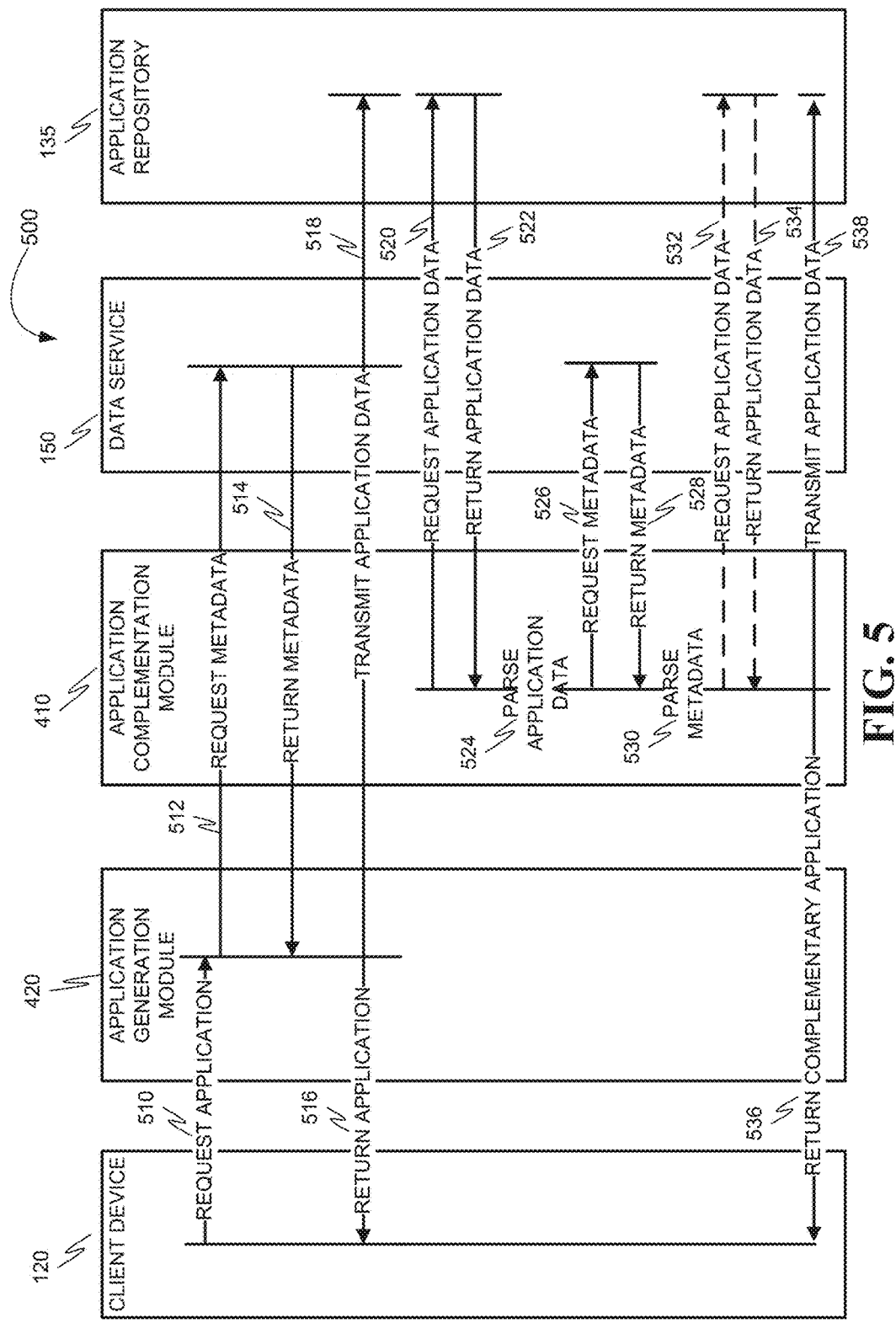
FIG. 5 is a ladder diagram illustrating a method, in accordance with an example embodiment, for generating a complementary application for a user-accessed application.

FIG. 5 is a ladder diagram 500 illustrating a method and elements, in accordance with an example embodiment, for generating a complementary application for a user-accessed application. The elements in FIG. 5 include elements from FIG. 1, FIG. 2 and FIG. 4, which elements are labeled with the same identifiers.

At operation 510, the user 110 uses client device 120 to request a first application from the application generation module 420 (or simply access an application from the application repository 135) which generates the requested first application using a data service 150 (e.g., an OData service). At operation 512, the application generation module 420 requests service metadata (e.g., an EDM) from data service 150, and at operation 514 the requested metadata is returned to the application generation module 420. The application generation module 420 then returns the generated first application to client device 120 of user 110 at operation 516 and transmits the generated first application to application repository 135, at operation 518, where it is stored as application data (e.g., application data 430A). At operation 520, the application complementation module 410 may then request application data associated with the first application from application repository 135, which also includes application data associated with other application (e.g., applications previously defined by user 110). The request from the application complementation module 410 may be triggered by new application data being stored in the application repository 135 or some other suitable trigger. At operation 522 the requested application data associated with the first application is returned to the application complementation module 410 by the application repository 135. At operation 524 the application complementation module 410 parses the returned application data to determine data collections (e.g., entity sets 220 associated with entities 240 used in the first application) of the data service 150 used in the first application and at least one navigation used in the first application to navigate between the used data collections.

At operation 526, the application complementation module 410 requests service metadata (e.g., EDM from metadata document) from the data service 150 and, at operation 528, the requested service metadata is returned to the application complementation module 410 by the data service 150. At operation 530 the service metadata is parsed by the application complementation module 410 to discover new navigations (e.g., navigations not used in the first application) between the data collections of data service 150 that are used in the first application, the new navigations being different (e.g., opposite routing) from the at least one navigation already used in the first application. An application that is complementary (e.g., provides different navigations between the data collections) to the first application may then be generated by the application complementation module 410, or this may be delegated to the application generation module 420. The application complementation module 410 returns the complementary application to client device 120 at operation 536 and transmits the complementary application to application repository 135, at operation 538, where it is stored as application data (e.g., application data 430B or 430C). The complementary application will use the data collections used in the first application and any new navigations between the used data collections that are discovered from parsing the service metadata retrieved from by application complementation module 410 from the data service 150 at operation 530. Alternatively, a recommendation regarding the generated complementary application may be provided (e.g., via a display of client device 120) to a developer or user of the first application before or after the complementary application is generated.

A different kind of complementary application may be generated by the application complementation module 410 based on a data collection of the data service 150 that is not used in the first application but that is otherwise relevant to the first application, e.g., based on information gathered from parsing the retrieved application data at operation 524. In this situation, a complementary application may be generated by the application complementation module 410 (or the application generation module 420) where the complementary application will use the data collection that is not used in the first application together with a data collection that is used by the first application and a navigation between the data collections that is discovered by parsing the metadata at operation 530.

Since the first application may be defined by the user 110 using the client device 120, generating the complementary application may include retrieving application data (e.g., 430B or 430C) associated with other applications defined by the user 110 from the application repository 135 by the application complementation module 410 at operation 532 and returning the requested application data to the application complementation module 410 at operation 534. Information regarding the data collections used in the previous user-defined applications for which application data was requested and the navigations used in the said applications to navigate between the respective data collections used in the previous user-defined applications may be determined (e.g., like the parsing of application data at operation 524) from the application data associated with previous user-defined applications that is retrieved from the application repository 135 via the application complementation module 410. A complementary application may then be generated, by the application complementation module 410, based on the data collections used in the previous user-defined applications and the navigations used in the previous user-defined applications to navigate between the respective data collections used in the previous user-defined applications.

Figure 6:
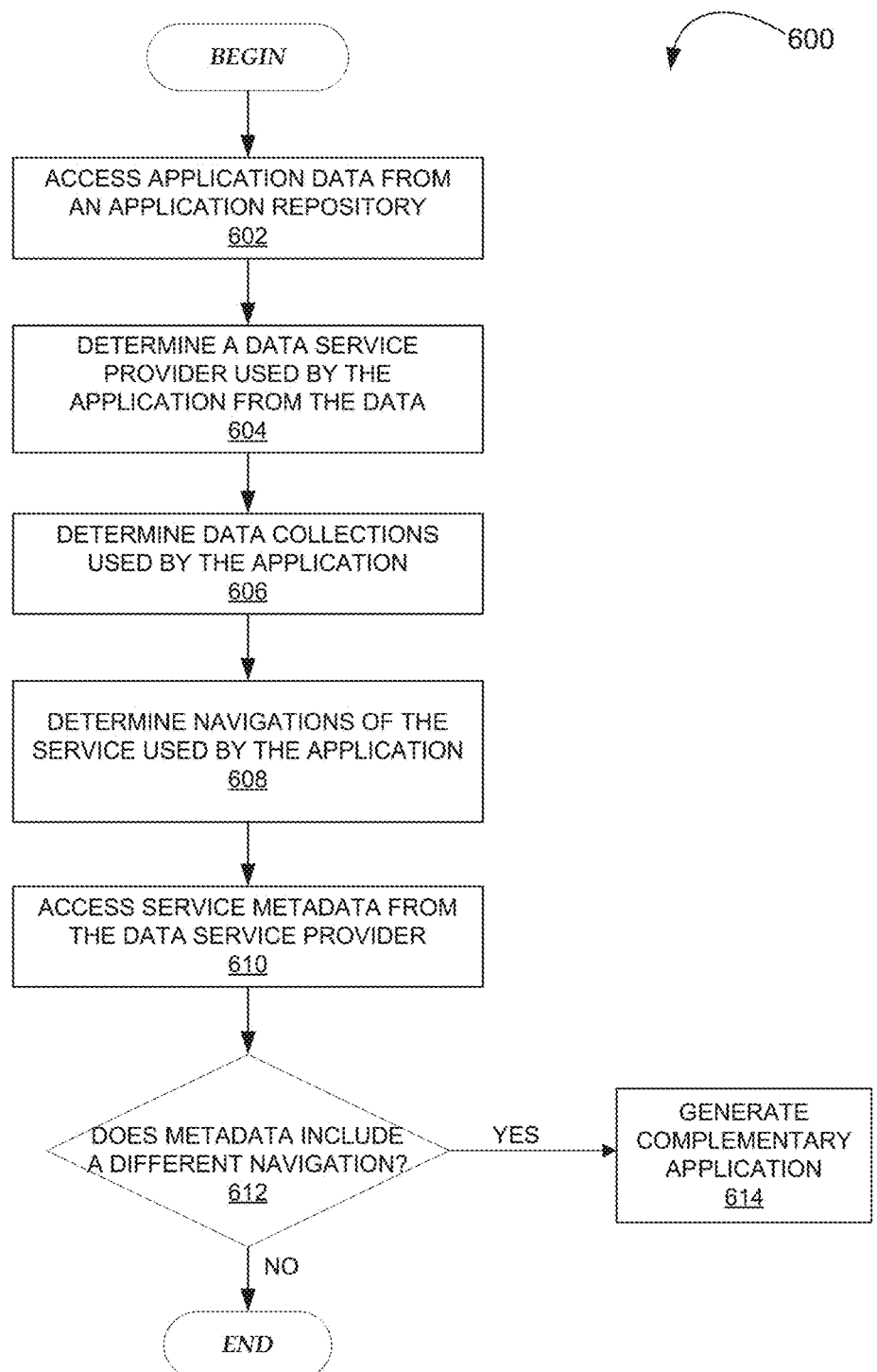
FIG. 6 is a flow diagram of a method, consistent with some embodiments, for generating a type of complementary application for a user-accessed application.

FIG. 6 is a flow diagram of a method 600, consistent with some embodiments, for generating a type of complementary application for a user-accessed application. The method 600 will be described with respect to the elements of FIGS. 1-5 as described above.

At operation 602, the application complementation module 410 may access application data associated with a first application from application repository 135, which also includes application data associated with other applications (e.g., applications previously defined by user 110). At operation 604 the application complementation module 410 parses the returned application data to determine a data service 150 that is used by the application. At operation 606 the application complementation module 410 parses the returned application data to determine data collections (e.g., entity sets 220 associated with entities 240 used in the first application) of the data service 150 used in the first application, and at operation 608 the application complementation module 410 parses the returned application data to determine at least one navigation used in the first application to navigate between the used data collections of the data service 150. At operation 610, the application complementation module 410 accesses service metadata (e.g., EDM) from the data service 150. At operation 612 the service metadata is parsed by the application complementation module 410 to discover any new (e.g., not used in the first application) navigations between the data collections of data service 150 that are used in the first application, the new navigations being different (e.g., opposite routing) from the at least one navigation already used in the first application. If there are any new navigations, then, at operation 614, an application that is complementary (e.g., provides different navigations between the data collections) to the first application may then be generated by the application complementation module 410, or this may be delegated to the application generation module 420. The application complementation module 410 returns the complementary application to the client device 120 and transmits the complementary application to the application repository 135, where it is stored as application data. If no new navigations are discovered, then the method 600 ends.

Figure 7:
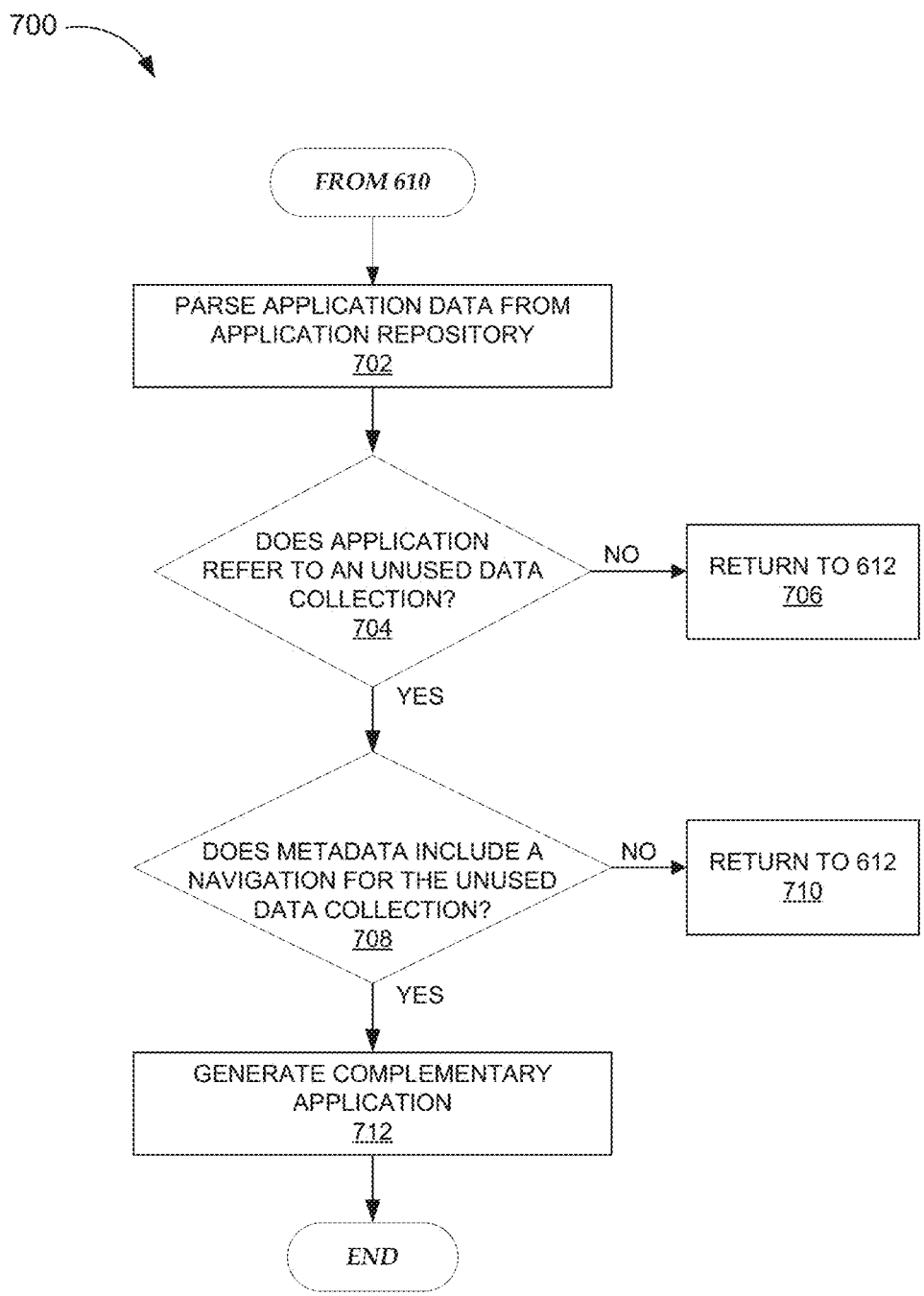
FIG. 7 is a flow diagram of a method, consistent with some embodiments, for generating a type of complementary application for a user-accessed application.

FIG. 7 is a flow diagram of a method 700, consistent with some embodiments, for generating a type of complementary application for a user-accessed application. The method 700 will be described with respect to the elements of FIGS. 1-5 as described above.

At operation 702 (which continues from operation 610 of method 600 of FIG. 6), the application complementation module 410 again parses the returned application data and, at operation 704, if the application data does not somehow identify a data collection of data service 150 that is not used by the first application, then at operation 706 method 700 returns to operation 612 of method 600 of FIG. 6. However, if the application data does somehow identify another data collection of data service 150 that is not used by the first application, then, at operation 708, it is determined whether the retrieved service metadata from the data service 150 disclose a navigation between a data collection of data service 150 used by the first application and the identified but unused data collection of data service 150. If, at operation 708, it is determined that there are no navigations of data service 150 between a data collection of data service 150 used by the first application and the identified but unused data collection of data service 150, then at operation 710 the method 700 returns to operation 612 of method 600 of FIG. 6. If, at operation 708 it is determined that there is at least one navigation of data service 150 between a data collection of data service 150 used by the first application and the identified but unused data collection of data service 150, then at operation 712 complementary application may be generated by the application complementation module 410 (or the application generation module 420) where the complementary application will use the data collection that is not used in the first application together with a data collection that is used by the first application and a navigation between the data collections that is discovered by parsing the service metadata at operation 708.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein may, in some example embodiments, comprise processor-implemented modules.

Similarly, the methods described herein can be at least partially processor-implemented. For example, at least some of the operations of a method can be performed by one or more processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or a server farm), while in other example embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments can be implemented in digital electronic circuitry, or in computer hardware, firmware, software, or combinations of these. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a network.

In example embodiments, operations can be performed by one or more programmable processors executing a computer program to perform functions by operating on input data and generating output. Method operations can also be performed by, and apparatus of example embodiments can be implemented as, special purpose logic circuitry. e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware can be a design choice. Below are set out hardware (e.g., machine) and software architectures that can be deployed, in various example embodiments.

Machine Architecture and Machine-Readable Medium

Figure 8:
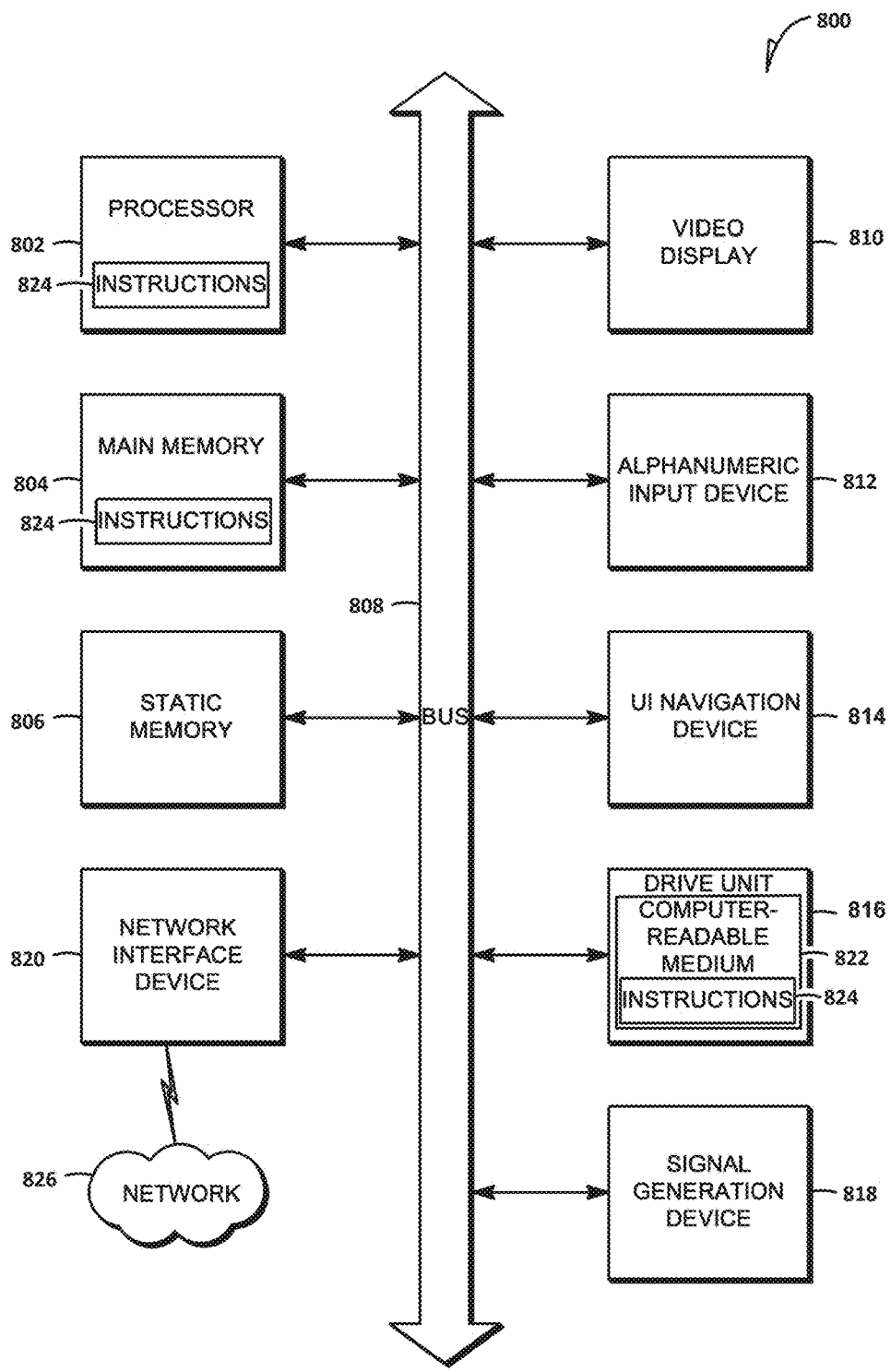
FIG. 8 is a diagrammatic representation of machine, in the example form of a computer system, within which a set of instructions may be executed to cause the machine to perform the methodologies discussed herein.

FIG. 8 is a block diagram of a machine in the example form of a computer system 800 within which instructions 824 for causing the machine to perform any one or more of the methodologies discussed herein can be executed. In alternative embodiments, the machine can operate as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a PC, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 can further include a video display unit 810 (e.g., a liquid crystal display (LCD) or a cathode ray tube (CRT)). The computer system 800 can also include an alphanumeric input device 812 (e.g., a keyboard or a touch-sensitive display screen), a user interface (UI) navigation device 814 (e.g., a mouse), a drive unit 816, a signal generation device 818 (e.g., a speaker), and a network interface device 820.

Machine-Readable Medium

The disk drive unit 816 includes a computer-readable medium 822 on which is stored one or more sets of data structures and instructions 824 (e.g., software) embodying or utilized by any one or more of the methodologies or functions described herein. The instructions 824 can also reside, completely or at least partially, within the main memory 804 and/or within the processor 802 during execution thereof by the computer system 800, the main memory 804 and the processor 802 also constituting machine-readable media.

While the computer-readable medium 822 is shown in an example embodiment to be a single medium, the term "machine-readable medium" can include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions (e.g., instructions 824) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM). Electrically Erasable Programmable Read-Only Memory (EEPROM), and flash memory devices; magnetic disks such as internal hard disks and removable disks; magneto-optical disks; and other ROM disks.

Transmission Medium

The instructions 824 can further be transmitted or received over a communications network 826 using a transmission medium. The instructions 824 can be transmitted using the network interface device 820 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions (e.g., instructions 824) for execution by the machine, and includes digital or analog communications signals or other media to facilitate communication of software.

Example Mobile Device

Figure 9:
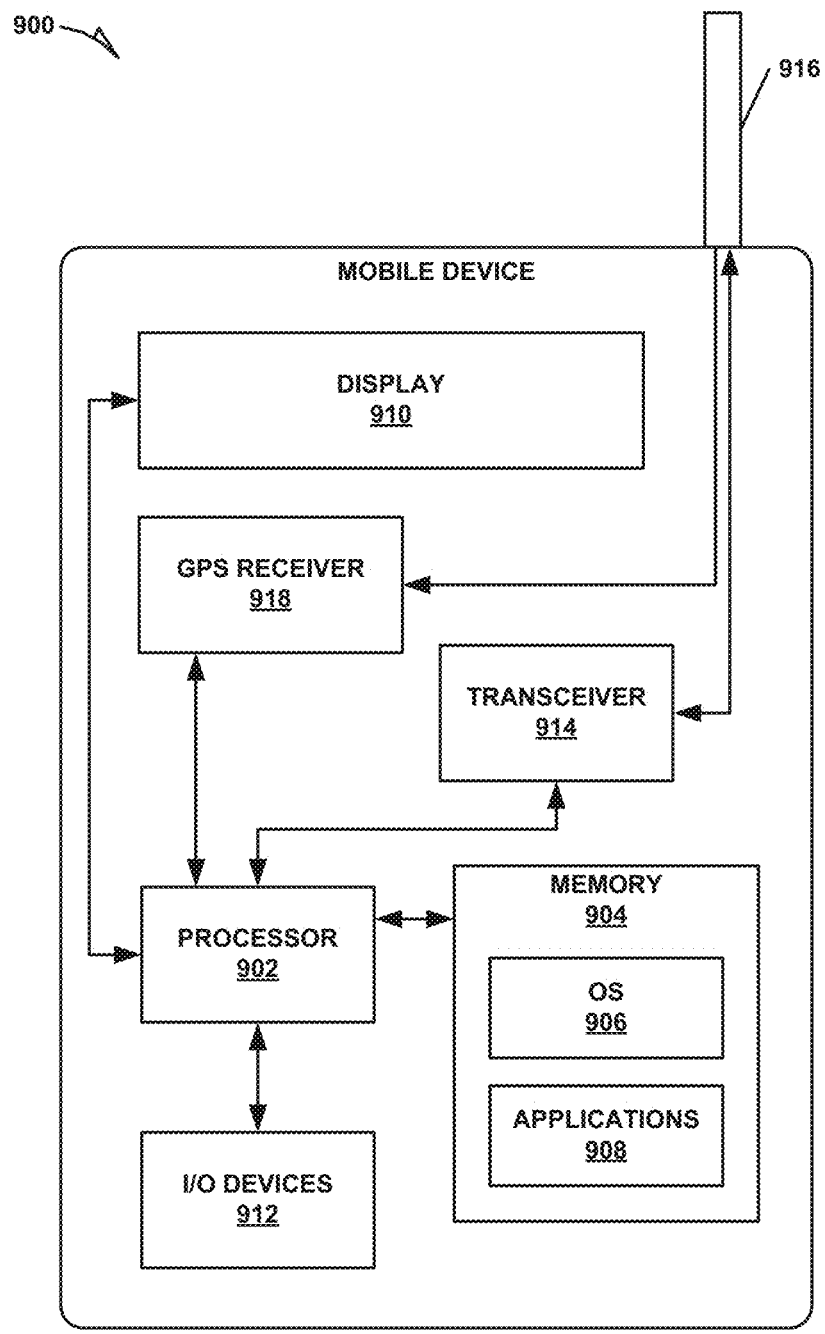
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or another type of memory, is typically accessible to the processor 902. The memory 904 may be adapted to store an operating system (OS) 906, as well as applications 908, such as a mobile location-enabled application that may provide location-based services (LBSs) to a user. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive Global Positioning System (GPS) signals.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents.

The invention claimed is:

1. A system comprising:
a memory that stores instructions; and
at least one hardware processor configured by the instructions to perform operations comprising:
receiving, from a client device, a request for a first application comprising functionality for at least a first navigation between a first data collection and a second data collection;
generating the first application and providing the first application to the client device;
storing the first application as application data in a data store;
parsing the stored application data of the first application to determine a data service that is used by the first application;
parsing the stored application data of the first application to determine at least a first data collection and at least a second data collection of the data service that are used in the first application;
determining, from the stored application data for the first application, a first navigation used in the first application to navigate between the first data collection and the second data collection of the data service;
searching service metadata for the data service describing navigations for navigating between data collections of the data service to determine at least a second navigation between the first data collection and the second data collection that is different than the first navigation used in the first application;
generating a first complementary application comprising functionality for the second navigation for navigating between the first data collection and the second data collection used in the first application;
providing the first complementary application to the client device;
parsing the stored application data of the first application to determine a third data collection of the data service that is not used by the first application;
determining from the service metadata for the data service at least a third navigation between the first data collection used in the first application and the third data collection of the data service that is not used by the first application;
generating a second complementary application that uses the first data collection used in the first application, the third data collection that is not used in the first application, and the third navigation for navigating between the first data collection used in the first application and the third data collection not used in the first application; and
providing the second complementary application to the client device.

2. The system of claim 1, wherein the service metadata for the data service is accessed from an OData service provider and the service metadata comprises an Entity Data Model (EDM).

3. The system of claim 2, wherein the EDM defines:
a data type associated with each of the data collections;
at least one association between the data types; and
at least one navigation between the data types based on the at least one association between the data types.

4. The system of claim 1, wherein the third data collection of the data service that is not used in the first application is determined based on a list of fields in the first application.

5. The system of claim 1, wherein the first application is defined by a user and generating the first complementary application includes retrieving other applications defined by the user from an application repository to access information regarding both the data collections used in the retrieved other applications and the navigations used in the retrieved other applications in order to navigate between the respective data collections used in the retrieved other applications.

6. The system of claim 1, wherein UX qualities of the first complementary application, such as fonts and themes, are based on UX qualities of the first application.

7. A method comprising:
receiving, from a client device, a request for a first application comprising functionality for at least a first navigation between a first data collection and a second data collection;
generating the first application and providing the first application to the client device;

storing the first application as application data in a data store;

parsing the stored application data of the first application to determine a data service that is used by the first application;

parsing the stored application data of the first application to determine at least a first data collection and at least a second data collection of the data service that are used in the first application;

determining, from the stored application data for the first application, a first navigation used in the first application to navigate between the first data collection and the second data collection of the data service;

searching service metadata for the data service describing navigations for navigating between data collections of the data service to determine at least a second navigation between the first data collection and the second data collection that is different than the first navigation used in the first application;

generating a first complementary application comprising functionality for the second navigation for navigating between the first data collection and the second data collection used in the first application;

providing the first complementary application to the client device;

parsing the stored application data of the first application to determine a third data collection of the data service that is not used by the first application;

determining from the service metadata for the data service at least a third navigation between the first data collection used in the first application and the third data collection of the data service that is not used by the first application;

generating a second complementary application that uses the first data collection used in the first application, the third data collection that is not used in the first application, and the third navigation for navigating between the first data collection used in the first application and the third data collection not used in the first application; and providing the second complementary application to the client device.

8. The method of claim 7, wherein the service metadata for the data service is accessed from an OData service provider and the service metadata comprises an Entity Data Model (EDM).

9. The method of claim 8, wherein the EDM defines:
a data type associated with each of the data collections;
at least one association between the data types; and
at least one navigation between the data types based on the at least one association between the data types.

10. The method of claim 7, wherein the third data collection of the data service that is not used in the first application is determined based on a list of fields in the first application.

11. The method of claim 7, wherein the first application is defined by a user and generating the first complementary application includes retrieving other applications defined by the user from an application repository to access information regarding both the data collections used in the retrieved other applications and the navigations used in the retrieved other applications in order to navigate between the respective data collections used in the retrieved other applications.

12. The method of claim 7, wherein UX qualities of the first complementary application, such as fonts and themes, are based on UX qualities of the first application.

13. A non-transitory machine-readable storage medium storing instructions which, when executed by at least one processor of a machine, cause the machine to perform operations comprising:

receiving, from a client device, a request for a first application comprising functionality for at least a first navigation between a first data collection and a second data collection;

generating the first application and providing the first application to the client device;

storing the first application as application data in a data store;

parsing the stored application data of the first application to determine a data service that is used by the first application;

parsing the stored application data of the first application to determine at least a first data collection and at least a second data collection of the data service that are used in the first application;

determining, from the stored application data for the first application, a first navigation used in the first application to navigate between the first data collection and the second data collection of the data service;

searching service metadata for the data service describing navigations for navigating between data collections of the data service to determine at least a second navigation between the first data collection and the second data collection that is different than the first navigation used in the first application;

generating a first complementary application comprising functionality for the second navigation for navigating between the first data collection and the second data collection used in the first application;

providing the first complementary application to the client device;

parsing the stored application data of the first application to determine a third data collection of the data service that is not used by the first application;

determining from the service metadata for the data service at least a third navigation between the first data collection used in the first application and the third data collection of the data service that is not used by the first application;

generating a second complementary application that uses the first data collection used in the first application, the third data collection that is not used in the first application, and the third navigation for navigating between the first data collection used in the first application and the third data collection not used in the first application; and providing the second complementary application to the client device.

14. The storage medium of claim 13, wherein the service metadata for the data service is accessed from an OData service provider and the service metadata comprises an Entity Data Model (EDM).

15. The storage medium of claim 14, wherein the EDM defines:
a data type associated with each of the data collections;
at least one association between the data types; and
at least one navigation between the data types based on the at least one association between the data types.

16. The storage medium of claim 15, wherein the third data collection of the data service that is not used in the first application is determined based on a list of fields in the first application.

17. The storage medium of claim 13, wherein the first application is defined by a user and generating the first complementary application includes retrieving other applications defined by the user from an application repository to access information regarding both the data collections used in the retrieved other applications and the navigations used in the retrieved other applications in order to navigate between the respective data collections used in the retrieved other applications.

* * * * *